United States Patent
Chen

(10) Patent No.: US 11,572,174 B2
(45) Date of Patent: Feb. 7, 2023

(54) SYSTEMS AND METHODS FOR MODIFYING CONTROL OF A DEVICE WITHIN A VEHICLE

(71) Applicant: Panasonic Avionics Corporation, Lake Forest, CA (US)

(72) Inventor: Tim Chen, Irvine, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 381 days.

(21) Appl. No.: 16/827,678

(22) Filed: Mar. 23, 2020

(65) Prior Publication Data

US 2021/0291985 A1    Sep. 23, 2021

(51) Int. Cl.

| | |
|---|---|
| *B64D 11/00* | (2006.01) |
| *H04B 7/185* | (2006.01) |
| *H04N 21/24* | (2011.01) |
| *H04W 4/40* | (2018.01) |
| *H04N 21/214* | (2011.01) |

(52) U.S. Cl.
CPC .. *B64D 11/00155* (2014.12); *B64D 11/00151* (2014.12); *H04B 7/18506* (2013.01); *H04N 21/2146* (2013.01); *H04W 4/40* (2018.02)

(58) Field of Classification Search
CPC .......... B64D 11/00155; H04B 7/18506; H04N 21/2146; H04N 21/25883; H04N 21/4227; H04W 4/40; H04L 67/12
See application file for complete search history.

(56) References Cited

U.S. PATENT DOCUMENTS

| | | |
|---|---|---|
| 7,124,426 B1 | 10/2006 | Tsuria et al. |
| 2007/0130591 A1 | 6/2007 | Brady, Jr. et al. |
| 2012/0020586 A1* | 1/2012 | Gilbert ............... A47G 27/0243 383/4 |
| 2015/0373121 A1 | 12/2015 | Secilmis |
| 2016/0133137 A1* | 5/2016 | Rencher ............... G08G 5/0021 701/537 |
| 2016/0286258 A1 | 9/2016 | Rajagopal et al. |
| 2017/0078231 A1* | 3/2017 | Haak ....................... H04L 51/48 |
| 2018/0007137 A1* | 1/2018 | Watson ............. H04W 28/0215 |
| 2018/0027036 A1* | 1/2018 | Watson ................. H04W 84/12 709/219 |
| 2018/0103039 A1* | 4/2018 | Thaler ..................... H04L 67/12 |
| 2018/0232565 A1 | 8/2018 | Koga et al. |
| 2020/0169844 A1* | 5/2020 | Forest .................... B64D 11/00 |
| 2020/0342771 A1* | 10/2020 | Mohan ................. G06Q 10/083 |

* cited by examiner

*Primary Examiner* — Diane L Lo
*Assistant Examiner* — Abusayeed M Haque
(74) *Attorney, Agent, or Firm* — Perkins Coie LLP

(57) ABSTRACT

Systems and methods for modifying control over a device in a vehicle are provided. The modification may comprise disabling an ability of a passenger to control the device via one or more passenger interface systems, limiting controls available to the passenger via the one or more passenger interface systems, transferring the ability to control the device to another user using a different user interface system, and/or transferring the ability to control certain functionalities of the device to another user using the different user interface system.

20 Claims, 6 Drawing Sheets

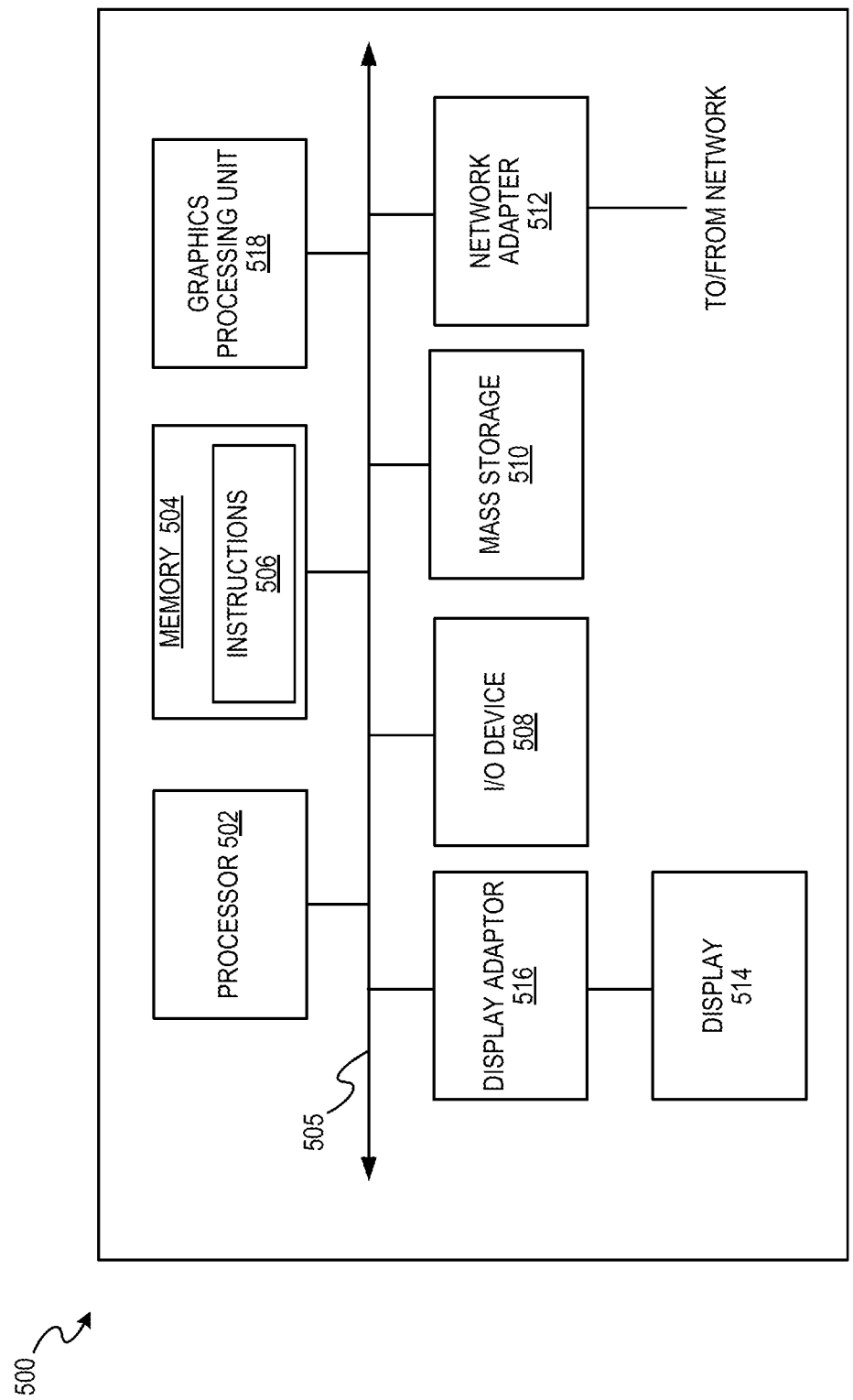

SYSTEMS AND METHODS FOR MODIFYING CONTROL OF A DEVICE WITHIN A VEHICLE

BACKGROUND

Technical Field

The present disclosure relates generally to disabling, transferring or otherwise modifying control over a device within a vehicle.

Related Art

Transportation service providers such as airlines have vehicles with In-Flight Entertainment Systems (IFE Systems), which provide passengers the ability to control certain in-flight functionalities (e.g., press a call button for an attendant, change a channel on a seatback entertainment system, increase or decrease a volume or a speaker, turn a reading light on and off, control an air condition vent) via one or more user interface systems.

A passenger, for example a young child, may use one or more user interface systems associated with its seat to repeatedly activate a call button or take other action that causes inconvenience to the crewmembers and fellow passengers. It can be difficult for a parent or other responsible party to prevent this from happening, especially where the user interface system is physically positioned at the passenger's seat and not with the parent or other responsible party.

The present disclosure is directed toward overcoming one or more of the problems identified above and/or providing advantages over prior systems and methods of controlling a passenger's ability to take certain actions in-flight.

SUMMARY

A system for modifying control over a device within a vehicle is disclosed herein. The system comprises a content distribution system configured to provide a vehicle communication network for the vehicle, one or more data stores coupled to the vehicle communication network and configured to passenger data, device data, user interface system data, associations data and/or other data, and at least one processor coupled to the vehicle communication network and at least one memory programmed with executable instructions. The one or more processors may execute the executable instructions to, inter alia, receive, from a first user interface system carried by the vehicle and coupled to the vehicle communication network, selection information (e.g., a request for disabling or transferring control) associated with a passenger and a device, and modify an ability of the passenger to control the device. The one or more processors may also execute the executable instructions to determine, based at least in part on a query of the at least one data store, that a valid association exists between the first user interface system and the passenger, for example, prior to modifying the ability of the passenger to control the device via a passenger interface system. Further, the one or more processors may execute the instructions to display confirmations, requests for selections, and/or other data on the user interface system and/or passenger interface system.

The user interface system from which selection information is received may comprise a personal electronic device ("PED") (e.g., passenger PED, a crew-member PED), an in-seat device (e.g., a controller in an armrest; a seatback entertainment system), or any other system that allows a user to make an input (e.g., a device having mechanical buttons or a touchscreen). The passenger interface system may comprise a passenger PED (e.g., a laptop, an iPad, a crew-issued electronic device), or an in-seat device. The user interface systems, including the passenger interface systems may be wired or wirelessly coupled to the device to be controlled.

Contemplated devices include any device that can be controlled by a user, especially passenger controlled devices such as call attendant buttons, overhead lighting units, video display devices, audio devices, AC vents, leg rests, and seats (e.g., that can be reclined or otherwise adjusted).

Also provided herein is a method of modifying control over a device in a vehicle. Contemplated methods comprise receiving, from a first user interface system carried by the vehicle and coupled to the vehicle communication network, selection information (e.g., a request for disabling or transferring control) associated with a passenger and a device; determining, based at least in part on a query of the at least one data store, that a valid association exists between the passenger and a user of the first user interface system (e.g., that the first passenger may act on behalf of the second passenger); and modifying an ability of the passenger to control the device via a passenger user interface system carried by the vehicle and associated with the passenger based on determining that a valid association exists between the passenger and the user of the first user interface system.

The step of modifying the ability of the passenger to control the device via the passenger user interface can comprise disabling (e.g., blocking, interfering with) a signal from passing from the passenger user interface system to the device. As another example, the step of modifying the ability of the passenger to control the device via the passenger user interface can comprise enabling a control signal to pass from a different user interface system to the device (e.g., from a user interface system not accessible by the passenger to the device).

Other advantages and benefits of the disclosed system and methods will be apparent to one of ordinary skill with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which:

FIG. 5 illustrates a block diagram of a computing system, in accordance with various aspects of the present disclosure.

DETAILED DESCRIPTION

Figure 1:
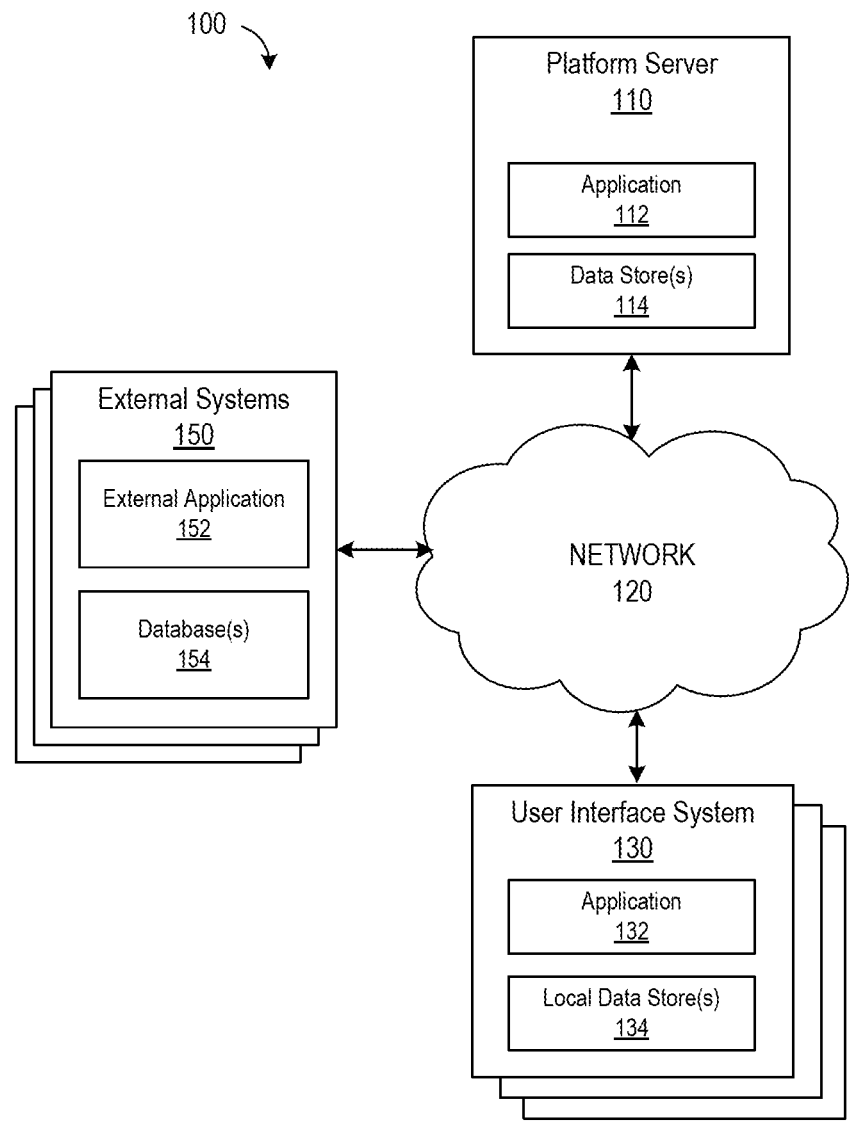
FIG. 1 schematically illustrates an example control modification system in accordance with the present disclosure.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

As used herein, the terms "environment," "platform," "component," "module," "system," and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a key having one or more data packets (e.g., data from one component interacting with another component in a local system, distributed system, and/or across a network such as the Internet with other systems via the key).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

The term "user" is used herein to refer to any person or entity that uses or otherwise interacts with the systems described here. User may refer to an operator, passenger, occupant, traveler, crew member, or any person or entity who interacts with any part of the systems described herein. The term "passengers" and/or "travelers" may refer to any persons who are customers or otherwise being transported by the vehicle who may use or otherwise interact with the systems described here.

References throughout this specification to "an embodiment" or "an implementation" mean that a particular feature, structure, or characteristic described in connection with the embodiment is included in at least one embodiment or implementation. Thus, appearances of the phrase "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or passenger control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application. Similarly, the various processes and methods described herein may be described with reference to flow charts having process blocks illustrated in a particular sequence. However, the example implementations are not limited to the particular sequence illustrated. Example implementations may include actions being ordered into a different sequence as may be apparent to a person of ordinary skill in the art or actions may be performed in parallel or dynamically, without departing from the scope of the present application.

The present disclosure is directed to innovative systems and methods that allow control of a device and/or device functionality available to one user (e.g., a passenger via a passenger interface system) to be modified. As used herein, a "passenger interface system" may refer to any user interface system usable by a passenger, for example, one assigned to a seat for which the device is provided. The modification may be a temporary disabling of control over the device and/or functionality via a user interface system (e.g., for a duration of the flight, for non-emergency times during a flight) and/or a transferring control over the device and/or functionality to another user interface system (e.g., another passenger interface system, a crew member PED). Data relating to users, passengers, devices, associations and/or other data may be stored in one or more data stores, which may allow an association between two or more users to be confirmed and/or validated such that a vehicle or system operator can identify what user(s) may consent to and/or initiate the disabling and/or transfer.

In some embodiments, a system for modifying control over a device includes a content distribution system configured to provide a vehicle communication network for the vehicle, one or more data stores coupled to the vehicle communication network, and one or more processors coupled to the vehicle communication network and to at least one memory programmed with executable instructions. The processor(s) are configured to execute the executable instructions to receive, from a first user interface system carried by the vehicle and coupled to the vehicle communication network, selection information (e.g., a request for disabling or transferring control) associated with a passenger and a device, and modify an ability of the passenger to control the device. The one or more processors may also execute the executable instructions to determine, based at least in part on a query of the at least one data store, that a valid association exists between the first user interface system and the passenger, for example, prior to modifying the ability of the passenger to control the device via a passenger interface system. In some embodiments, the vehicle is an aircraft, and the content distribution system, data store(s), processor(s) and at least one memory are each within the aircraft. Further, the one or more processors may execute the instructions to display confirmations, requests for selections, and/or other data on the user interface system and/or passenger interface system. For example, where an authorization by a user (e.g., a guardian) is required in order to initiate and/or complete the modification, a request may be sent to a user interface system for an authorization (e.g., the user interface system, the passenger interface system, another user interface system not associated with the user interface system from which selection information is received and/or the passenger interface system). Based on the request, a user presented with the request may input an authorization of the request, and/or restrict the modification (e.g., not allow it, or allow a limited/restricted version of the modification requested), which may be received by the one or more processors.

A user interface system may include, among other things, a passenger control unit (PCU) positioned overhead or in an armrest or other portion of a seat and wired or wirelessly connected to device(s), a personal electronic device (PED), a video system including a display (e.g., a seatback display), and/or any suitable device that can be used to generate an input signal for an IFE system (e.g., a switch, a button, a touchscreen). The user interface system may be connected to one or more line replaceable units (LRUs) within the IFE system, and may or may not include a display.

As used herein, the term "selection information" should be interpreted broadly to include any information helpful in identifying a modification desired by a user, including for example passenger data (e.g., name, seat, age), a device and/or a functionality of the device that the user does not want the passenger to have the ability to control, a passenger interface system, functionality for which a control should be modified, a time period, a restriction and/or authorization data (e.g., an authorization confirmation code, biometric information, payment account information).

Various embodiments described herein provide for a software application stored as instructions in a memory of a user interface system (sometimes referred to herein as a device memory) that are executable by a processor of the user interface system (sometimes referred to herein as a device processor). By executing the software application, a graphical user interface ("GUI") may be generated through which the user may input selection information, receive a confirmation/information regarding a modification, and/or receive a request and respond to a request as further described herein. The user may input the selection information into screens generated by the GUI and/or scan selection identifying information (e.g., using a camera or other imaging device coupled to the user interface system, radio frequency identification reader, or identification readers). Where the user and user interface system are in flight, the user interface system may communicate with the IFE system, a Passenger Service System or Unit of an IFE system, another user interface system and/or device on the aircraft to be controlled, via a communication network supplied by the IFE system. If the passenger is on the ground (e.g., not yet departed the airport on take-off or has landed at an airport), the user interface system may utilize the software application to initiate a modification, provide an authorization, make a purchase or otherwise communicate data via the user interface system over any available communication network (e.g., wired, Wi-Fi, cellular network, etc.). In some embodiments, the above described software application may be pre-loaded into a device memory integrated with a mode of transportation and connected to an internal network system of the mode of transportation, such as in-seat and/or seat-back devices including a monitor display (interchangeably referred to herein as "in-seat device"). Some embodiment provide for using the IFE system of the aircraft, for example, via a browser-based portal application. The browser-based portal application may be hosted by the IFE system and accessed via a browser application executed at a PED and/or in-seat device.

Some or all of the content distribution system, the at least one data store, the at least one processor, and the at least one memory may be within the vehicle (e.g., aircraft). The user interface system from which the at least one processor receives selection information (interchangeably referred to herein as "requesting user interface system") may comprise a passenger controlled device and/or a crew member controlled device. For example, the requesting user interface system may comprise, among other things, a passenger PED, a passenger PCU, a crew-member PED, and/or an in-seat device. In some aspects, the requesting user interface system may be associated with a "requesting user" passenger at a seat adjacent the passenger who's ability to control a device is being modified (interchangeably referred to herein as "subject passenger"), and may be a guardian of the subject passenger. In other aspects, the requesting user interface system may be a crew member PED issued by the aircraft provider and assigned to/accessible by one or more crew members, and the requesting user may be a crew-member. In yet other aspects, the requesting user may be a passenger in a seat not adjacent the subject passenger, for example, a passenger in a different row (e.g., 1 row ahead or behind, 2 rows ahead or behind, 3 rows ahead or behind, 4 rows ahead or behind, 5 rows ahead or behind).

The ability to control any suitable devices and device functionalities via a specific user interface system or systems may be modified via contemplated systems and methods. Exemplary functionalities include lighting and/or resetting a call light that alerts a crew member of a passenger need, turning a vent on/off, moving a vent, turning a reading light on/off, changing a volume associated with content enjoyable on an in-flight device (e.g., video and/or audio content such as TV shows, movies; web browser; an installed application), changing a channel of the in-flight device, making a purchase, and making an order.

In some contemplated embodiments, a requesting user may obtain full remote control of a subject passenger's device (e.g., IFE device with display screen), so that the requesting user and subject passenger can browse the entire media library or a subset thereof, and make a selection to be played on the subject passenger's device. The selection may also be optionally played on a device associated with the requesting user's seat (e.g., the requesting user's IFE device with display screen) such that the requesting user and subject passenger are watching the same content at the same time. For example, a requesting user may select a set of content from the content library that is suitable for the subject passenger. Such content may be rated for kids, and/or include content that is suitable for adults but which the requesting user approves of. The selection for the set of content may be made pre-flight and/or during the flight. Upon modifying control such that the subject passenger device is controllable only by the requesting user interface system, the requesting user may make individual selections of content to be played on the subject passenger device and optionally at a requesting user's device. In some aspects, the requesting user may input instructions via the requesting user interface system such that a set of pre-selected television shows or movies (e.g., an animation series) is played continuously on the subject passenger device. As another example, a requesting user may select a set of content from the content library that is suitable for subject passenger. Additionally or alternatively to the requesting user interface system having full remove control of subject passenger's IFE device, the modification could provide for allowing the subject passenger to have some control over the device via the passenger user interface system, The limited control could comprise of allowing the subject passenger to view and/or select from the set of content selected by the requesting user via the subject passenger's interface system. This would allow the subject passenger to feel they are in full control of their IFE device even though the information presented to/selectable by the subject passenger has been limited.

Other contemplated embodiments provide for shared control of a device between two or more user interface systems. For example, modifying the ability of the passenger to control an IFE device having a seatback monitor can including (a) sending a request to the requesting user interface system upon receiving a control selection via a passenger user interface system, and (b) causing the seatback monitor to display content according to the control selection of the subject passenger only upon receiving an authorization via the requesting user interface system. In such embodiments, the subject passenger may have access to the entire content library, but may only be able to select and view a content item upon approval from the requesting user. These and other systems and methods contemplated herein can comprise communication capabilities between the two or more user interface systems (e.g., instant messaging).

Still other contemplated embodiments allow for controlling the timing in which content is presented to a subject passenger via an IFE device, controlling the timing of which a call attendant light turns on and/or resets, and/or controlling the timing of any suitable functionality of any suitable device. For example, a requesting user can pre-select a time for which a call attendant light of a subject passenger should turn on. This pre-selected time can be, for example, based on when a medication needs to be taken so that the attendant can remind the subject passenger in person, and/or present a reminder via an IFE device display of the subject passenger's seat. As another example, a requesting user can preselect content to be viewed via the subject passenger's IFE device and/or requesting user's IFE device at a pre-selected time or based on a pre-selected event (e.g., when there is 2 hours and 5 minutes before a flight is scheduled to land). As yet another example, the requesting user may set an IFE device of subject passenger's seat to play content that was played on the requesting user's IFE device at a pre-set time (e.g., 5 minutes, 15 minutes, 30 minutes) after being played on the requesting user's IFE device. This allows the requesting user to view a content item before it is presented to subject passenger, and block it from being presented to the subject passenger (e.g., by blocking and/or replacing the content item with other content).

The above are only a few examples of the numerous types of control modifications that can be made using systems and methods of the inventive subject matter.

Exemplary user interface system combinations used by the requesting user and subject passenger include, among other things: seatback IFE device of requesting user and seatback IFE device of subject passenger; PED of requesting user and IFE device of subject passenger; PED of requesting user and a passenger control unit that includes a flight attendant call button, overhead reading light control button, flight attendant reset button, audio channel selector, audio volume selector and/or charging ports; and arm rest controller and seatback IFE device.

FIG. 1 schematically illustrates an example control modification system in accordance with the present disclosure. The infrastructure of the control modification system 100 shown in FIG. 1 comprises a platform server 110, which hosts and/or executes one or more of the various functions, processes, and/or methods described herein of the control modification system 100. Platform server 110 may comprise one or more dedicated servers, or may instead comprise cloud instances, which utilize shared resources of one or more servers. These servers or cloud instances may be collocated and/or geographically distributed. Platform server 110 may also comprise or be communicatively connected to platform server application 112 and/or one or more data stores 114. In addition, platform server 110 may be communicatively connected to one or more user interface systems 130 via network 120. It should be appreciated that platform server 110 may optionally be communicatively connected to one or more external systems (e.g., websites, apps, other servers, etc.) via network 120. Such external systems may host third party systems or remote services and/or resources, for example, a third party system that tracks authorizations by guardians to allow a modification in the control of certain functionalities in order to reduce liability risks for vehicle providers and/or comply with rules imposed by or on the vehicle provider. Platform server 110 may be implemented as one or more computing devices such as, for example, computing device 500 illustrated in FIG. 5 discussed below.

Network 120 may include the Internet and/or an intranet, and platform server 110 may communicate with user interface system(s) 130 (which can include UIS 130a, UIS130b, UIS130c and so forth) through the network 120 using standard transmission protocols, such as HyperText Transfer Protocol (HTTP), Secure HTTP (HTTPS), File Transfer Protocol (FTP), FTP Secure (FTPS), SSH FTP (SFTP), and the like. While platform server 110 is illustrated as connected to various systems through a single set of network(s) 120, it should be understood that platform server 110 may be connected to the various systems via different sets of one or more networks. For example, platform server 110 may be connected to a subset of user interface systems 130 and/or external systems via the Internet, but may be connected to one or more other user interface systems 130 and/or external systems via an intranet. As another example, network 120 may be or otherwise include an internal network system in a mode of transportation (e.g., a vehicle such as an aircraft or transportation vehicle) that connects user interface systems 130 carried by the mode of transportation to the platform server 110. Network 120 may also include any wired or wireless network, for example, a cellular network (e.g., 3G, 4G LTE, 5G, etc.), local area network (LAN), wide area network (WAN), etc. Furthermore, while only one or a few user interface systems 130, application 112, and sets of database(s) 114 are illustrated, it should be understood that the infrastructure may comprise any number of user interface systems, external systems, server applications, and databases.

User interface system(s) 130 may comprise any type of computing devices capable of wired and/or wireless communication. Contemplated user interface systems include any device/system that can facilitate transactions and other communications whilst the users are in mid-flight. Example user interface systems 130 may include PEDs through which a user is able to interface with the platform server 110 and/or other user interface systems, which may include any PEDs having wireless communication capability, such as cellular phones, smart phones, tablet computers, laptop computers, and other portable electronic devices, a digital electronic media device, wearable smart electronic device, smart watch, any mobile electronic device, and the like. FIG. 5 illustrates an example computing device 500 that may be implemented as a user interface system 130. User interface systems 130 may also be a device that is integrated with a mode of transportation and connected to an internal network system of the mode of transportation (e.g., interactive screen on the back of the headrest on an airplane), such as in-seat and/or seatback devices including a monitor display (interchangeably referred to herein as in-seat device). FIG. 2 illustrates an example mode of transportation comprising user interface systems 130.

Platform server 110 may comprise web servers which host one or more websites, web services, and/or Internet-based applications. In embodiments in which a website is provided, the website may comprise a GUI generating one or more user interface screens, including, for example, webpages generated in HyperText Markup Language (HTML) or other language and displayed on the user interface systems 130. Platform server 110 transmits or serves the GUI in response to inputs from user interface system(s) 130. In some embodiments, the GUI may be served in the form of a wizard, in which case two or more user interface screens may be served in a sequential manner, and one or more of the sequential user interface screens may depend on an interaction of the user or user interface system 130 with one or more preceding user interfaces. The requests to platform server 110 and the responses from platform server 110, including the screens, may both be communicated through network 120. These user interface screens or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more data stores (e.g., data stores 114) that are locally and/or remotely accessible to platform server 110. Platform server 110 may also respond to other requests from user interface system(s) 130.

Platform server 110 may further comprise, be communicatively coupled with, or otherwise have access to one or more external systems 150 having external application(s) 152 and database(s) 154. The external systems may be configured to validate associations between two users within the aircraft and/or provide information associated with one or more devices, user interface system and/or users based on requests received from the platform server 110. The external systems may also help with compliance with rules associated with modifying user control of devices and/or functionalities. For example, the platform server 110 may communicate with the external systems to request a confirmation or data showing a relationship between two or more users (e.g., that one user is authorized to temporarily disable and/or transfer a passenger's control of a device and/or functionality on the vehicle under the rules of an organization) via network 120 and obtain information from third party systems. The request from platform server 110 may be communicated based on inputs received from user interface systems 130 at the platform server 110 so to facilitate or otherwise complete the request. External systems may include their own dedicated servers executing application and database(s) for executing functions thereof and storing data for executing those functions. Example third party systems may include, but are not limited to, systems external or otherwise remote of the platform server 110 and/or user interface systems 130 described herein.

Platform server 110 may further comprise, be communicatively coupled with, or otherwise have access to one or more data stores 114. For example, platform server 110 may comprise one or more servers which manage one or more data stores 114. A user interface system 130 or application 112 executing on platform server 110 may submit data (e.g., user data, age data, time data, disability data, flight data, user preference data, selection data, content data, restriction data) to be stored in data store 114 and/or request access to data stored in data store 114. Data stores 114 may further be configured to store tracking information, for example, how many times a minor attempted to control a device functionality that it no longer had control over (e.g., turn a call attendant button), how often there is a modification initiated by an user that requested a modification (interchangeably referred to herein as "requesting user"), and/or how often there is no modification initiated by someone authorized to initiate a modification (e.g., a guardian who provided authorization pre-flight).

Any suitable database may be utilized, including without limitation MySQL™, Oracle™, IBM™, Microsoft SQL™, Sybase™, Access™, and the like, including cloud-based database instances and proprietary databases. Data may be sent to platform server 110, for instance, using the well-known POST request supported by HTTP, via FTP, etc. This data, as well as other requests, may be handled, for example, by server-side web technology, such as a servlet or other software module (e.g., application 112), executed by platform server 110.

In embodiments in which a web service is provided, platform server 110 may receive requests from user interface systems 130 and/or external system(s) 150, and provide responses in eXtensible Markup Language (XML) and/or any other suitable or desired format. In such embodiments, platform server 110 may provide application programming interfaces (API) software development kits (SDK) which define the manner in which user interface system(s) 130 and/or external system(s) may interact with the web service. Thus, user interface system(s) 130 and/or external system(s) (which may each themselves be servers) can define their own user interfaces and rely on the web service to implement or otherwise provide the backend processes, methods, functionality, storage, etc., described herein.

For example, in such an embodiment, a client application 132 (which can be application 132a of UIS 130a, application 132b of UIS 130b, application 132c of UIS 130c and so forth) executing on one or more user interface system(s) 130 may interact with an application 112 executing on platform server 110 to execute one or more or a portion of one or more of the various functions, processes, methods, and/or software modules described herein. Client application 132 may be "thin," in which case processing is primarily carried out on the backend by application 112 on platform server 110. An example of a thin client application is a browser-based portal application, which requests, receives, and renders webpages at user interface system(s) 130, while the application 112 on platform server 110 is responsible for generating the webpages and managing database functions. Alternatively, the client application may be "thick," in which case processing is primarily carried out client-side by user interface system(s) 130, for example, as a software application installed on the user interface system 130. It should be understood that client application 132 may perform an amount of processing, relative to application 112 on platform server 110, at any point along this spectrum between "thin" and "thick," depending on the design goals of the particular implementation. In any case, the application described herein, which may wholly reside on either platform server 110 (e.g., in which case application 112 performs all processing) or user interface system(s) 130 (e.g., in which case application 132 performs all processing) or be distributed between platform server 110 and user interface system(s) 130 (e.g., in which case application 112 and client application 132 both perform processing), can comprise one or more executable software modules that implement one or more of the processes, methods, or functions of the application(s) described herein.

Similarly, application 112 may interact with an external or third party application executing on an external system to execute one or more or a portion of one or more of the third party functions, processes, methods, and/or software modules and retrieve information based thereon. The external system may provide an API and/or SDK which defines the manner in which platform server 110 may interact with the web services provided by the external system. Application 112 may be "thin," in which case processing is primarily carried out by the external system. Alternatively, the application 112 may be "thick," in which case processing is primarily carried out by platform server 110. It should be understood that platform server 110 may perform an amount of processing, relative to external system, at any point along this spectrum between "thin" and "thick," depending on the design goals of the particular implementation. In any case, the application described herein, which may wholly reside on either platform server 110 or external system or be distributed between platform server 110 and external system 150, can comprise one or more executable software modules that implement one or more of the processes, methods, or functions of the application(s) described herein.

In some embodiments, application 112 may interact with third party applications executing on an external system to import data and information from external systems. For example, instructions for executing one or more or a portion of one or more of the third party functions, processes, methods, and/or software modules may be stored at the platform server 110. Such interaction may be provided by an importer module included as a plug-in in the application 112 for retrieving data in a first format associated with an external system and converting the data into a second format associated with the platform server 110. An example importer module may be provided as an API and/or SDK as described above. Alternatively, or in combination, the importer module may include data scraping instructions for extracting data from a human-readable output generated by processes executed at the external systems. In various embodiments, the data scraping instructions may be web scraping instructions for extracting data from web services provided by the external systems.

Figure 2A:
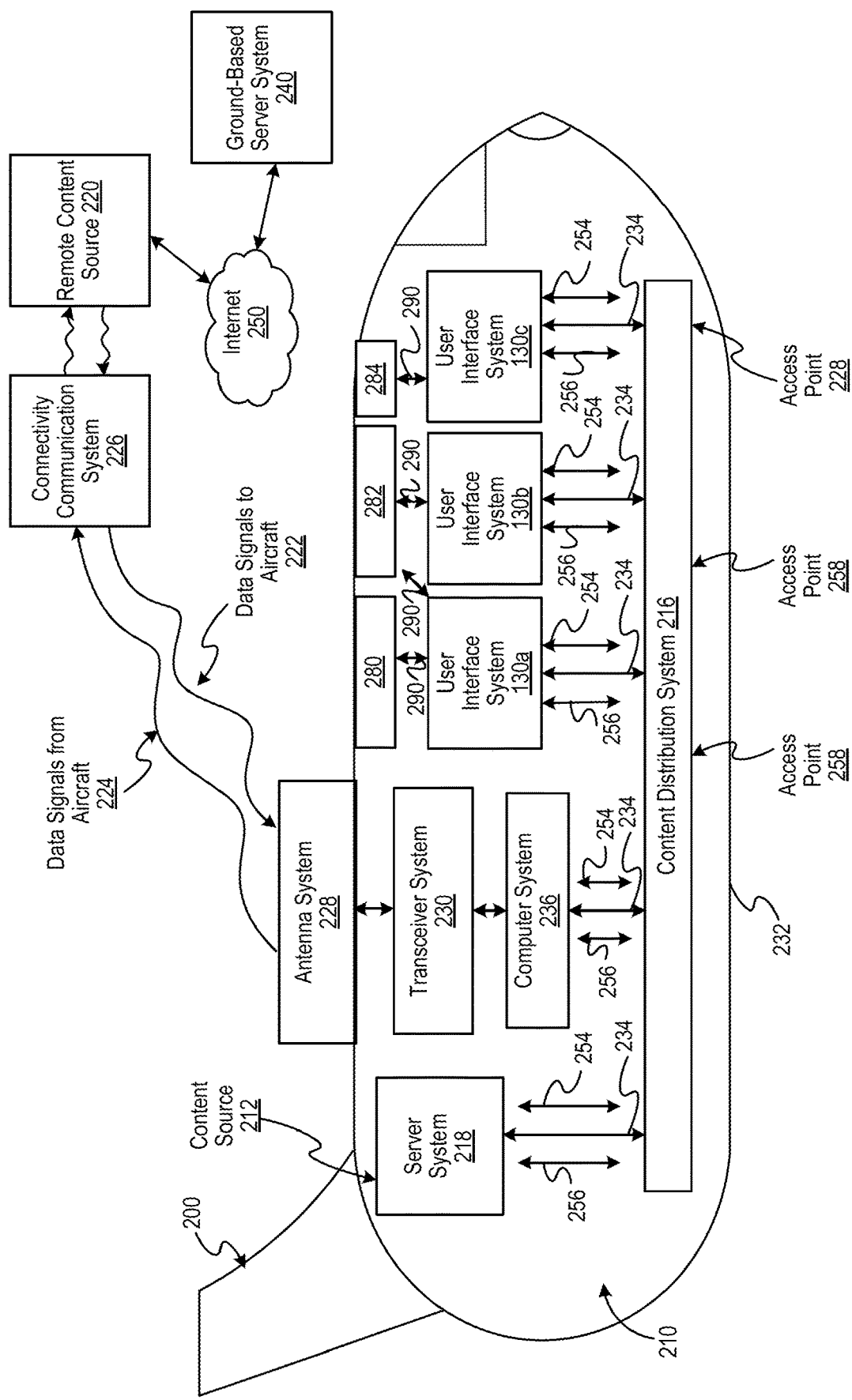
FIG. 2A is a schematic block diagram of an example of a vehicle information system for installation on-board a vehicle that may comprise a portion of or the entirety of the control modification system of FIG. 1 in accordance with the present disclosure.

FIG. 2A is a schematic block diagram of an example of a vehicle information system for installation on-board a vehicle that may comprise a portion of or the entirety of the control modification system of FIG. 1 in accordance with the present disclosure.

FIG. 2A shows an example vehicle information system 210 (referred to herein as system 210) that can be configured for installation aboard a vehicle 200. The system 210 may be configured to provide an internal network system within the vehicle 200. When installed on an aircraft, system 210 may comprise an aircraft passenger IFE system. While FIG. 2A illustratively depicts an embodiment where vehicle 200 is implemented as an aircraft, the term "vehicle" is not to be so limited. It will be appreciated that the "vehicle" may refer to any and all types of vehicles providing a mode of transportation including, but not limited to, personal transportation vehicles (e.g., automobiles, boats, motorcycles, etc.) and vehicles of common carriers, such as airplanes, passenger trains, buses, cruise ships, sightseeing vehicles (e.g., ships, boats, buses, cars, etc.), or any other moving vehicle.

Figure 2B:
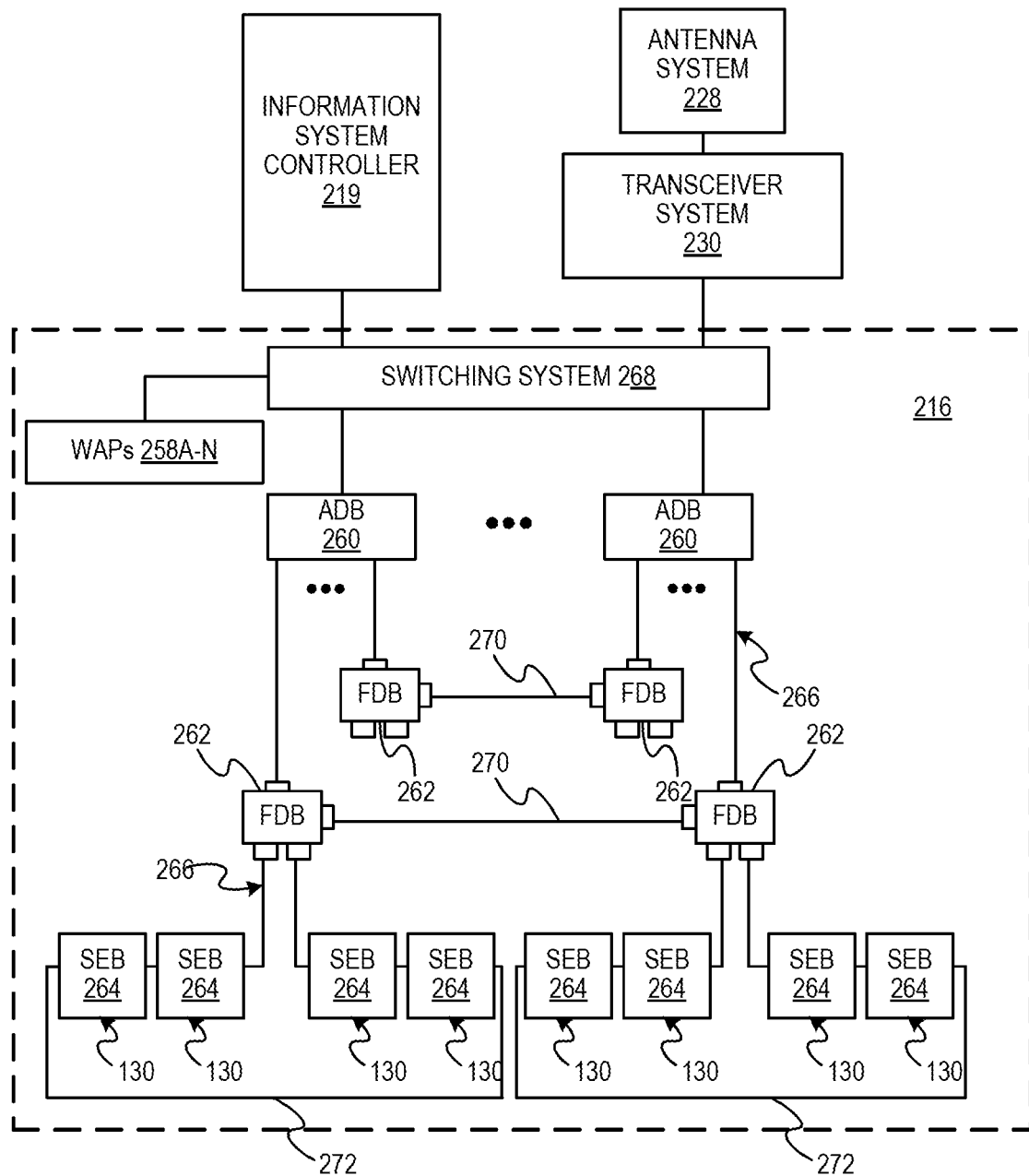
FIG. 2B is a schematic block diagram illustrating an example content distribution system in accordance with the present disclosure.

System 210 comprises a content source 212 and one or more user interface systems (e.g., user interface systems 130 of FIG. 1 shown as 130a, 130b, 130c for illustrative purposes) communicatively coupled with a real-time content distribution system 216. Although the user interface systems are shown to be adjacent one another, it should be appreciated that the different user interface systems can be positioned anywhere in the vehicle, and do not need to be adjacent one another. The content distribution system 216 may provide the internal network system within the vehicle 200 for coupling the user interface systems 130 to content server system 218. The user interface systems 130a-130c may comprise one or more of passenger PEDs, crewmember PEDs, in-flight devices, and any other device through which a user can provide inputs to and/or receive content from content distribution system 215. The content source 212 may include one or more internal content sources, included in a content server system 218 installed aboard the vehicle 200, one or more remote (or ground-based) content sources 220 external from the vehicle 200, or a distributed content system (e.g., a distributed cloud system). The content server system 218 and computer system 236 can be provided as or as part of an information system controller 219 (as shown in FIG. 2B) for providing overall system control functions for system 210 and/or for providing connectivity functionality, including information transmitted from user interface systems 130 to content server system 218, as desired.

The information system controller may include one or more servers and databases which host and/or execute one or more of the various functions, processes, and/or methods described herein. Example services (sometimes referred to herein as IFE services or functionality or vehicle entertainment services or functionality) offered by system 210 includes, but is not limited to, wired or wireless communication connectivity (such as in-flight Intranet and Internet), information, entertainment (e.g., multimedia entertainment services such as video, movies, television programming, audio, games, etc.), communications (e.g., telephone, VoIP, messaging, etc.), payment services, control modification services, and/or other system services during travel aboard vehicle 200.

In some embodiments, system 210 provides wireless connectivity to a ground-based server system 240. The ground-based server system 240 may be one or more external systems and may comprise dedicated servers and databases, or may instead be part of a cloud infrastructure, which utilize shared resources of one or more servers for executing and/or supporting the vehicle entertainment and content modification functionality. For example, the content server system 218 of the information system controller may comprise the platform server 110 for hosting application 112 and data stores 114. In some embodiments, the platform server 110 may be distributed across the content server system 218 and the ground-based server system 240. As such, the content server system 218 may host and/or execute one or more of the various functions, processes, and/or methods described herein locally at the vehicle 200 and store information thereof in local data stores for transmission to a ground-based server system 240. The ground-based server system 240 may host and/or execute the one or more of the various functions, processes, and/or methods described herein.

In some embodiments, the information system controller 219 may also comprise or be communicatively connected to a backend application (e.g., application 112) and/or one or more databases (e.g., data store(s) 114)). For example, content server system 218 may include one or more servers that host one or more backend application platforms for interfacing with user interface systems 130a-c. The content server system 218 transmits or serves these user interface systems 130a-c in response to requests from user interface systems 130a-c over the content distribution system 216. In some embodiments, the interfaces may be served in the form of a backend server application, in which case multiple user interfaces systems may be served in a sequential manner. For example, a passenger may access a software application executed on the user interface system 130 to request and respond to content server system 218, which causes backend server application to perform the requested functions (e.g., disable a control on a user interface system, transfer control to another user interface system, block, mute or interfere with a signal 290 from a user interface system from being received by a device (e.g., 280, 282, 284), enable a signal from another user interface system to be received by the device, send notifications to a display of a user interface system). These executed functions may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases that are locally accessible to content server system 218, remotely accessible from remote content source 220, or ground-based server system 240.

Multimedia and other content available from the content sources 212 and/or remote content source 220 provide for two-way communications (e.g., bidirectional communications), such as real-time access to the Internet 250 and/or telecommunications systems (e.g., cellular telecommunication systems), and/or may disable and/or transfer the ability to control a device functionality using a specific user interface system. For example, such content may cause a signal sent via the passenger interface system to be ignored by the device it is meant to send the signal to (e.g., to turn on, to reset), and/or enable another system to communicate a control signal or command to the passenger device (e.g., to turn on, to reset). Content available from the content sources 212 may include television programming content, music content, podcast content, photograph album content, audiobook content, and/or movie content without limitation. Content as shown and described herein is not exhaustive and is provided herein for purposes of illustration only and not for purposes of limitation. Multimedia content can comprise any conventional type of audio and/or video content, such as stored (or time-delayed) content and/or live (or real-time) content.

Being configured to distribute and/or present and/or allow access to the content provided by content sources 212, system 210 can communicate with the content source 212 and/or remote content source 220 in real time and in any conventional manner, including via wired and/or wireless communications. System 210 and the remote content source 220, for example, can communicate directly and/or indirectly via an intermediate communication system, such as a connectivity communication system 226. Connectivity communication system 226 may provide wireless bidirectional communications, for example, data signals comprising content for system 210. In some embodiments, the bidirectional communication may be a bidirectional communication link over the Internet or other wireless communication protocol. System 210 thereby can receive content from remote content source 220 and/or ground-based server system 240 via data signal 222 and/or transmit (upload) content via data signal 224 (which may be referred to collectively as a bidirectional communication link), including navigation and other control instructions. The remote content source 220 and ground-based server system 240 are shown as having access to the Internet 250 using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. The connectivity communication system 226 may comprise a satellite communication system or any conventional type of wireless communication system, such as a cellular communication system (not shown) and/or an Aircraft Ground Information System (AGIS) communication system (not shown).

To facilitate communications with the remote content source 220, system 210 may also include an antenna system 228 and a transceiver system 230 for bidirectional communication of data (e.g., content, control, information, etc.) with the remote content source 220. The antenna system 228 may be disposed outside of the aircraft, such as an exterior surface of a fuselage 232 of the vehicle 200. The antenna system 228 can receive content from the remote content source 220 and provide the data, as processed by the transceiver system 230, to a computer system 236 of the information system controller. For example, the transceiver system 230 may include a transmitter having an encoder, a modulator and an up-converter for encoding, modulating, and up-converting data signals from the content distribution system 216 to antenna system 228 and to the remote content source 220 as signals 224. The transceiver system 230 may also include a receiver having a decoder, a demodulator and a down-converter for decoding, demodulating and down-converting signals received by the antenna system 228 from the connectivity communication system 226 into content 234, such as, data signals including commands, instructions, video, audio, multimedia, internet, and any content corresponding to functionality of the system 210. While only one transceiver system 230 is shown, a plurality of transceiver systems may be included to enable simultaneous reception of signals from a plurality of transponders. The components of the subsystems included in the transceiver system 230 may be partially or fully integrated and/or separately implemented.

Content in the form of data signals received by the antenna system 228 may be communicated to the computer system 236 and passed to the content server system 218 and/or directly to one or more of the user interface systems 130 as data signals for communicating content 234, instructions 254, and/or control signals 256, as desired. Although shown and described as being separate systems for purposes of illustration, the computer system 236 and the server system 218 (e.g., media server system) can be partially and/or fully integrated.

User interface systems 130a-c may be communicatively coupled to the content distribution system 216 via one or more corresponding access points 258. One of more of the user interface systems 130a-c may include a display device configured to display or otherwise present and/or allow access to content 234 to a user, for example, via a GUI for generating screens, pages, or webpages. The user interface system(s) 130a-c includes a hardware interface to connect to an access point 258 that provides a wired and/or a wireless connection for the user interface system 130a-c. One or more user interface systems 130a-c may comprise a software application that a passenger or other user downloads and installs onto their associated PED to receive, view and/or otherwise access content 234 (e.g., a request for authorization, a confirmation of modification, details relating to the modification, an interface for controlling another passenger's device (e.g., overhead lighting unit, IFE device) or system (e.g., passenger control unit)) via an access point 258 or may be preprogrammed into the user interface system. One or more of user interface systems 130a-c may be utilized by the requesting user and/or subject passenger to send and/or receive instructions 254, send and/or receive control signals 256, interact with content 234, and control the manner in which the selected content 234, and/or instruction 254 and/or control signals 256 is received and/or presented.

The user interface system 130 can include an input/output system (not shown) for permitting the passenger to communicate with system 210, such as via an exchange of control signals 256 and passenger instructions 254. For example, the input system can permit the passenger to enter one or more passenger instructions 254 for controlling the operation of system 210. Illustrative passenger instructions 254 can include instructions for initiating communication with the content server system 218 to perform one or more functions described herein, such as accessing and/or using the selected content 234, and instructions for modifying (e.g., disabling, transferring) communications between the passenger interface system and the device. Where control of a device is transferred to a requesting user's interface system, it is contemplated that the requesting user can input instructions to control the device of subject passenger (e.g., to change a channel on the subject passenger's IFE device, to order food/drinks through the passenger's IFE device or other device such that the items are delivered to the subject passenger's seat, to light a call attendant button and to send a message to a crew-member interface system that the subject passenger has a specific need—such as medication).

Parent/Child Call Attendant Example

In the example shown in FIG. 2A, a user may utilize user interface system 130a to input selection information (e.g., request a modification in how a passenger or other user may interact with user interface system 130b to control a functionality of device 282), which can comprise content 234, instructions 254 and/or control signals 256. For illustrative purposes, it is contemplated that device 282 comprises a call attendant light, and that user interface system 130b comprises a button that can be pressed by a passenger to cause device 282 to light up and/or to send a signal to a crew member device that alerts the crew member that a passenger in a selected seat/row requests assistance (e.g., via a sound, a visual indicator, a vibration).

The requesting user may be a parent of the subject passenger, and authorization for the vehicle operator to allow the requesting user to modify the subject passenger's ability to control one or more devices available at subject passenger's seat may have been provided pre-flight (e.g., while travel arrangements were being made). Additionally or alternatively, in response to requesting the modification, the requesting user may receive a request for information, signature and/or an authorization, which the requesting user may provide via the user interface system 130a. Additionally or alternatively, a notification may be sent via the user interface system that the user may request or authorize a modification (e.g., based on the system identifying that the user is the legal guardian of a passenger, and that the passenger has misused a device by, for example, pressing the call attendant button without a need).

Upon receiving selection information, the platform server may determine, for example based on the selection information and/or a query of one or more databases, that a valid association does or does not exists between (a) the request user and/or the requesting user's interface system and (b) the subject passenger and/or the subject passenger's user interface system. If a valid association is determined not to exist, the platform server may reject the request. If a valid association is determined to exist (e.g., based on the requesting user being a legal guardian of the subject passenger, based on misuse of a device by the subject passenger, based on an authorization provided to the vehicle operator), the platform server may modify an ability of the subject passenger to control the device. This modification can comprise sending instructions, control signals and/or content, via content distribution system 216, to user interface system 130b to disable a signal from user interface system 130b to device 282 by blocking or interfering with signal 290 and/or deactivating or turning off a signal switch that activates the call attendant light and/or cutting off power to the device. Additionally or alternatively, the modification can comprise sending instructions, control signals and/or content, via content distribution system 216, to user interface system 130a that enables a signal 290 to be sent to 282 (e.g., when requesting user inputs a selection to turn on the call attendant light via user interface system 130a). The requesting user and/or subject passenger may be notified of the successful modification and information relating thereto.

FIG. 2B is a schematic block diagram illustrating an example content distribution system in accordance with the present disclosure. FIG. 2B illustrates content distribution system 216 for the system 210. The content distribution system 216 couples and supports communication between the information system controller 219, and the plurality of user interface systems 130. Thus, in various embodiments, the content distribution system 216 may provide for an internal network system of vehicle 200.

The content distribution system 216, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 522.11 and/or wireless metropolitan-area networks (MANs), which also are known as WiMax Wireless Broadband, in accordance with IEEE Standard 522.16. Preferably being configured to support high data transfer rates, the content distribution system 216 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2B, the content distribution system 216 can be provided as a plurality of area distribution boxes (ADBs) 260, a plurality of floor disconnect boxes (FDBs) 262, and a plurality of seat electronics boxes (SEBs) (and/or video seat electronics boxes (VSEBs) and/or premium seat electronics boxes (PSEBs)) 264 being configured to communicate in real time via a plurality of wired and/or wireless communication connections 266. The content distribution system 216 likewise can include a switching system 268 for providing an interface between the content distribution system 216 and the information system controller 219. The switching system 268 can comprise a conventional switching system, such as an Ethernet switching system, and is configured to couple the information system controller 219 with the area distribution boxes 260. Each of the area distribution boxes 260 is coupled with, and communicates with, the switching system 268. In addition, the content distribution system 216 includes one or more wireless access points (WAPs) (258A to 258N) connected in communication with the switch system 268 for wireless distribution of content to user interface systems 130, such as for example, PEDs.

Each of the area distribution boxes 260, in turn, may be coupled to, and communicate with, at least one floor disconnect box 262. Although the area distribution boxes 260 and the associated floor disconnect boxes 262 can be coupled in any conventional configuration, for example, the associated floor disconnect boxes 262 are disposed in a star network topology about a central area distribution box 260 as illustrated in FIG. 2B. Each floor disconnect box 262 is coupled with, and services, a plurality of daisy-chains of seat electronics boxes 264. The seat electronics boxes 264, in turn, are configured to communicate with the user interface systems 130. Each seat electronics box 264 can support one or more of the user interface systems 130.

The switching systems 268, the area distribution boxes 260, the floor disconnect boxes 262, the seat electronics boxes (and/or video seat electronics boxes (VSEBs) and/or premium seat electronics boxes (PSEBs)) 264, the antenna system 228, the transceiver system 230, the content source 212, the information system controller 219, and other system resources of the system 210 are provided as line replaceable units (LRUs). The use of LRUs may facilitate maintenance of the system 210 because a defective LRU can simply be removed from the system 210 and replaced with a new (or different) LRU. The defective LRU thereafter can be repaired for subsequent installation. Advantageously, the use of LRUs can promote flexibility in configuring the content distribution system 216 by permitting ready modification of the number, arrangement, and/or configuration of the system resources of the content distribution system 216. The content distribution system 216 likewise can be readily upgraded by replacing any obsolete LRUs with new LRUs.

The content distribution system 216 can include at least one FDB internal port bypass connection 270 and/or at least one SEB loopback connection 272. Each FDB internal port bypass connection 270 is a communication connection 266 that permits floor disconnect boxes 262 associated with different area distribution boxes 260 to directly communicate. Each SEB loopback connection 272 is a communication connection 266 that directly couples the last seat electronics box 264 in each daisy-chain of seat electronics boxes 264 for a selected floor disconnect box 262 as shown in FIG. 2B. Each SEB loopback connection 272 therefore forms a loopback path among the daisy-chained seat electronics boxes 264 coupled with the relevant floor disconnect box 262.

The various aspects of the present disclosure may be implemented without using FDB 262. When FDB 262 is not used, ADB 260 communicates directly with SEB 264 and/or information system controller 219 may communicate directly with SEB 264 or the seats. The various aspects of the present disclosure are not limited to any specific network configuration.

Figure 3:
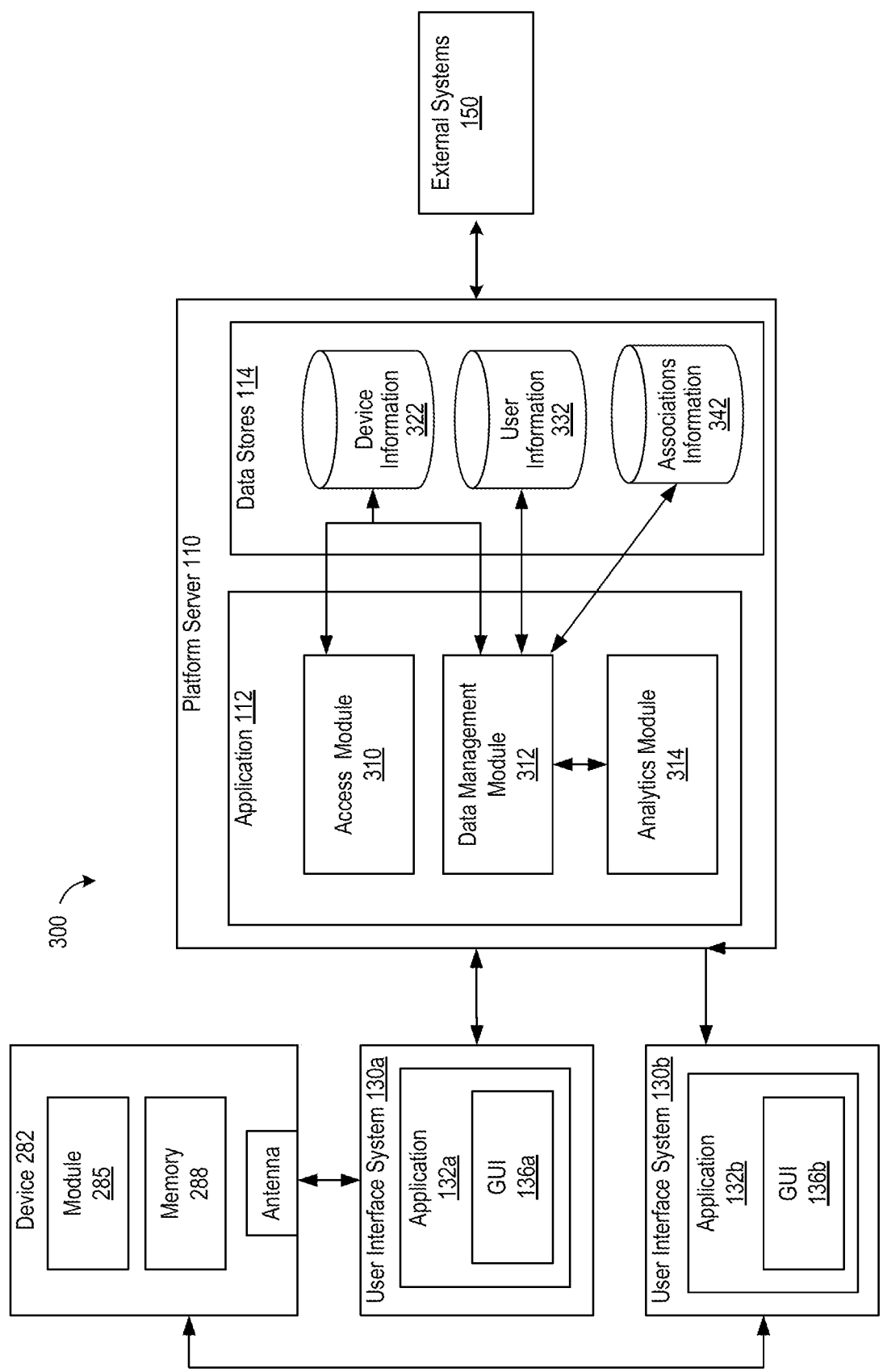
FIG. 3 schematically illustrates an example platform environment in accordance with the present disclosure.

FIG. 3 schematically illustrates an example platform environment in accordance with the present disclosure. FIG. 3 illustrates a computing environment 300 including the user interface system(s) 130 (e.g., 130a and 130b), and platform server(s) 110 as described above in connection with FIG. 1. In accordance with various embodiments herein, a user interface system(s) (e.g., 130a) may communicate with platform server 110 to modify a subject passenger's ability to control a device function via one or more user interface systems (e.g., 130b) associated with the subject passenger. User interface system 130a may also communicate with the device where the modification included a transfer of the control of the device function.

Content Restriction Example

In the example shown in FIG. 3, a user may utilize user interface system 130a having application 132a, which generates GUI 136a to input selection information (e.g., request a modification in how a passenger or other user may interact with user interface system 130b having application 132b, which generates GUI 136b to control a functionality of device 282), which can comprise data, content, instructions signals, etc. For illustrative purposes, it is contemplated that device 282 comprises a seatback IFE device positioned in front of the subject passenger, and that user interface system 130b comprises a controller that can be used by the subject passenger to select a channel, movie or other content viewable via device 282. Device 282 may comprise a module 285, a memory 288, and an antenna.

The requesting user may be a crew-member, and the subject passenger may be a minor whose parent or guardian made requests/provided authorization to restrict certain content when making travel arrangements. Additionally or alternatively, a notification may be sent via the user interface system suggesting that the crew-member initiate a modification (e.g., based on the system identifying that the subject passenger is a minor and watching adult content (e.g., a movie with nudity)). In some embodiments, the requesting user may be presented with a copy (e.g., a live video) of the subject passenger user interface's screen such that the requesting user can view what the subject passenger is viewing without having to walk to the subject passenger's seat.

Upon receiving selection information, the platform server 110 may determine, for example based on the selection information and/or a query of one or more databases, that a valid association does or does not exists between (a) the request user and/or the requesting user's interface system and (b) the subject passenger and/or the subject passenger's user interface system. Additionally or alternatively, the association may be presumed based on the crew-member selection information (e.g., crew-member password). It should be appreciated that a valid association may exist based on different factors (e.g., by requesting user being an employee, by requesting user being seated next to a minor that has turned on an overhead light but is asleep, by a requesting user seated next to a passenger that has turned the AC vent on and facing the requesting user), and that an authorization by a guardian or other passenger may not necessarily be required.

If a valid association is determined to exist (e.g., based on the requesting user being a legal guardian of the subject passenger, based on misuse of a device by the subject passenger, based on an authorization provided to the vehicle operator) and/or is presumed, the platform server may modify an ability of the subject passenger to control the device and/or may cause a change in the device (e.g., a change from presenting the movie having nudity to presenting a cartoon tv show). This modification can comprise sending instructions, control signals and/or content to user interface system 130b to disable a signal to device 282 by blocking or interfering with a signal between user interface system 130b and device 282, and/or deactivating or turning off a signal switch that controls a device function and/or cutting off power to the device. Additionally or alternatively, the modification can comprise sending instructions, control signals and/or content to user interface system 130a that enables a signal to be sent to 282 (e.g., when requesting user inputs a selection to change a channel via user interface system 130a). In some aspects, it is contemplated that the requesting user can be required to input authorization via the requesting user interface system before a request (e.g., change in channel, purchase) made by the subject passenger via the subject passenger interface system is allowed/approved. In some aspects, it is contemplated that the requesting user may have full remote control of the subject passenger's IFE device via the requesting user interface system. For example, the requesting user may select a set of content (e.g., television shows, movies) to be played on subject passenger's IFE device, and have it set to replay/loop the selected content. The requesting user and/or subject passenger may be notified of the successful modification and information relating thereto.

The platform environment 300 may be a computing environment hosted by, for example, platform server 110 of FIG. 1, and may be executed thinly or thickly by application 112 and/or application 132. The application 132 can include instructions that, when executed by a processor, displays GUI (e.g., GUI 136a, 136b). The passenger, crewmember and/or other user may interact with GUI 136 via an input device coupled to the user interface system 130 to generate screens, webpages, and other interfaces for receiving inputs. The application (e.g., application 132a, 132b) may then transmit the inputs to the platform server 110 for performing the various functions described herein. For example, the user interface system 130 may generate GUI 136, by application 132 functioning as a thin or thick client. In one embodiment, the user interface system 130 includes application 132 installed on the user interface system 130 (e.g., a PED and/or in-seat device) as a software application defined by instructions stored in the local data store 134. In this embodiment, the user interface system 130 locally executes the instructions to generate GUI 136, through which a user may interact with screens displayed by the GUI to request a modification, authorize a modification, control a device, or otherwise communicate with platform server 110 and/or one or more user interface systems. Alternatively, in some embodiments, the application 132 may be a web-browser application through which the user interface system 130 may access the application 112 implemented as a browser-based portal application. In this embodiment, the GUI 136 of the client application 132 generates screens displaying webpages hosted by the platform server 110 for interacting with the application 112. User inputs may include any interaction with the application 132, for example, instructions and commands as described above in connection to FIG. 1 and selection information input in response to prompts from the application 112 or otherwise. Selection information may include, but is not limited to, passenger or crew member credentials usable for authenticating access to the application 132 and/or application 112, itinerary identifying information, passenger information, device information, association data, guardian/authorized controller identifying information, user interface system data and/or device functionality data. Screens generated by the GUI 136 may include textboxes, text areas, drop-down menus, check boxes, sliders, etc. where passenger input data may be provided.

Itinerary identifying information may include, for example but not limited to, boarding pass information (e.g., record locator or reservation code, ticket number, etc.), flight information (e.g., flight times, departing destination, arriving destination, flight numbers, operating airline identifiers), authorization information, and/or seat location information. This information could be used to determine what pairings amongst passengers on a particular flight are permissible/authorized (e.g., information indicating passenger A is a guardian of passenger B; information indication passenger A signed waiver forms). This information could include device data, content data and/or device functionality data relating to a selection made pre-flight, which is associated with content and or control functions that may be made available to a passenger at a particular seat via a particular passenger interface system within the vehicle.

In some embodiments, the user interface system 130 may include or be communicatively coupled to an image capture device, such as a camera, that can be utilized to capture an image of a boarding pass and extract the necessary information therefrom. Additionally or alternatively, the image capture device can be used to scan a barcode (e.g., a QR code) within the vehicle that is associated with a device whose control over which can be modified. For example, a user may scan a QR code positioned at or near a device (e.g., passenger lighting control unit, call light), and receive selections available to the user (e.g., modifications available). Application 132 may comprise computer readable instructions that scans the image and extracts itinerary information displayed on the boarding pass, and/or at or adjacent the device. The extracted information can be used to identify and/or retrieve content to present to the user (e.g., modifications available) via platform 110. In some embodiments, the boarding pass itself may also include a bar code that the application 132 may scan to extract itinerary, authorization data, passenger identifying information and/or any other data helpful in utilizing the control modification system as described herein. In some embodiments, a passenger may have an electronic boarding pass that may be stored in a local data store 134 of the user interface system 130. The electronic boarding pass may be loaded to or otherwise accessed by the application 132 and used to obtain data therefrom.

As illustrated in FIG. 3, application 112 may include a plurality of software modules, each comprising computer-readable instructions for executing functions associated therewith. For example, the application 112 may comprise an access module 310, a data management module 312, and an analytics module 314. As illustrated, the platform environment 300 may include the application 112 coupled to one or more data stores 114. In the illustrative example, the data store(s) 114 may include, at least, a data store 322 configured to store device and/or device functionality information, a data store 332 configured to store user, user interface system and/or passenger information, and a data store 342 configured to store associations information (e.g., associations between one or more users within a flight). Data stores can also store information such as timing information, user identification information, disability information, needs information, approved content information and/or any other information/data helpful in using the control modification system. The data stores 322, 332, 342 (and any other data stores) may be included in a single data storage device, separate data storage devices, or distributed in a plurality of data storage devices.

The access module 310 may include instructions for providing user access to the platform server 110. The access may be provided based on credentials and/or identifying information received from the user interface system 130. In some embodiments, a crew member or passenger may enter passenger credentials, such as username, passwords, biometrics, confirmation codes, etc. for authenticating access to the application 132, which may be validated against credentials and/or other data stored in one of the data stores 114. In other embodiments, access to the platform server 110 and the functions performed therein may be granted based on itinerary information (e.g., seat and flight information) and such itinerary information could include information associated with an authorization to take over control and/or deactivate control of a device by a subject passenger or other user via the subject passenger or other user's interface system.

For example, a first screen generated by the GUI 136 may prompt the passenger to provide one or more pieces of information (e.g., passenger data, crew-member identification data) before permitting further access to the functions executed by the platform server 110. The provided information may be validated against information stored in data stores 114 and/or verified against information accessed through an airline operator system (e.g., one of the third party systems 150).

The data management module 312 may include instructions for receiving data inputs from a user interface system 130, storing data in data store(s) 114, obtaining data from data store(s) 114, and obtaining third party information from external (e.g., third party) systems. The data management module 312 may include one or more importer modules configured to retrieve data from third party systems. The data management module 312 may also receive passenger inputs comprising selection information and/or control modification parameters relating to one or more devices and/or functionalities. The data management module 312 may also obtain data from a database of vehicle 200, for example, flight data where the vehicle 200 is an aircraft.

One or more data stores may store device information and/or controllable function information in association with user authorization information. One or more data stores (e.g., 342) may store association information between users and/or passengers on a flight. For example, a data store may be configured to store device information representative of devices that are controllable by a user (e.g., passenger lighting control unit, display screen)). Such data may include authorization for the user to control a device associated with its own seat and/or another user (e.g., subject passenger). In such a case, association information may be stored in one or more data stores associating the requesting user and the subject passenger. The device information may additionally or alternatively be stored in association with device functionality information (e.g., turning light of a PLCU on/off, turning call attendant button on, resetting call attendant button, changing a channel, changing a volume) and/or user interface system information (e.g., user interface systems that are configured to control the device).

In some embodiments, device information, user information and other information described herein (as separate data and/or associated with other data) may be received from the user interface system 130 based on passenger inputs and information stored in the data store(s). In some embodiments, device information, user information and other information described herein (as separate data and/or associated with other data) may additionally or alternatively be obtained from data stores 114. In some embodiments, device information, user information and other information described herein (as separate data and/or associated with other data) may additionally or alternatively be generated by a third party system, for example, an airline operator system.

For example, a passenger may select travel arrangements from a webpage hosted by the airline operator system and the airline operator system may generate itinerary information including the selected arrangements and authorizations relating to one or more devices to be controlled with in the airplane during flight times by someone other than the passenger seated with the device, associate the information with a record locator, and store the information in a database of the airline operator system. The record locator may be provided to the passenger with a confirmation of the booking. The itinerary information, associated pre-authorization/pre-modification information, and/or any other information associated with pre-authorization/pre-modification may be uploaded to one or more data stores prior to take off and during travel. When the user is onboard the vehicle, the pre-authorization/pre-modification information included in or associated with the itinerary information may be used to initiate a modification. The access module 310 may also be utilized to retrieve the itinerary information to validate the information received from user interface system 130.

The data store 332 may store user information, and may store such information in association with itinerary identifying information, device information, device function information, passenger identifying information, etc. Data store 322 may store device information such as restrictions (e.g., available times for modifications, passcode or other key associated with allowing modifications to control of the device, etc.

The data management module 312 may include instructions to forward obtained data to the analytics module 314, which may contain instructions for processing the data and performing various functions of the application 112. The analytics module 314 may evaluate user supplied parameters to determine user preferences and generate confirmations as well as selection and/or authorization requests based thereon. The analytics module 314 may generate selection and/or authorization requests based on evaluating the user defined parameters (e.g., device information, time information, content information, purchase information) and/or user needs and restrictions (e.g., minor not authorized to make purchases without authorization from requesting user, medication needs).

The analytics module 314 may include instructions for transmitting the confirmation and/or selection and/or authorization requests to the data management module 312. Data management module 312 may then transmit the confirmation and/or selection and/or authorization requests (or other content) to the user interface system 130 for review by a passenger via the GUI 136. If the user makes a selection or inputs information (e.g., authorization), the data management module 312 receives the information, determines whether a modification is authorized (e.g., if an association exists between a requesting user and the subject passenger, modifies an ability of the subject passenger to control the device, for example, by blocking a signal from the passenger interface system (e.g., 130b) to the device 282 and/or enabling a signal from the user interface system (e.g., 130a) to the device 282.

Figure 4:
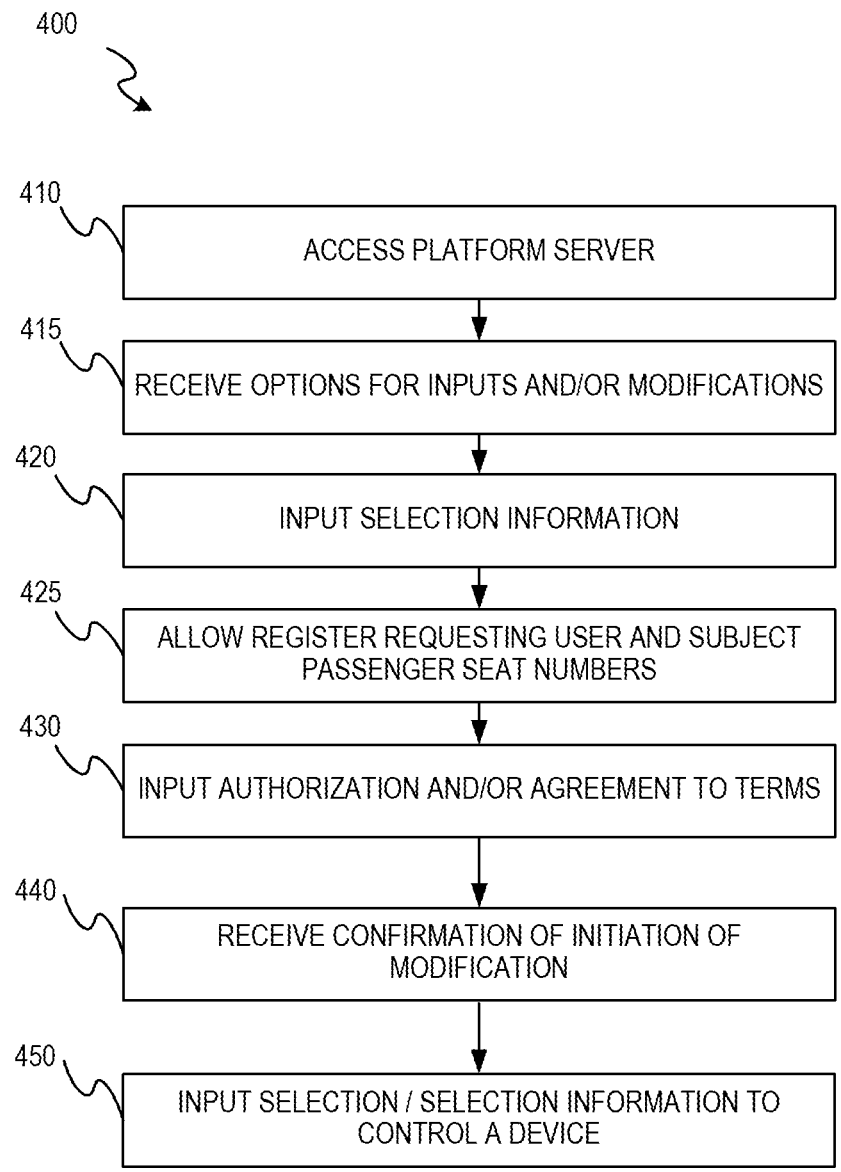
FIG. 4 is an example method flow for utilizing the control modification system in accordance with the present disclosure.

FIG. 4 is an example method flow for utilizing the control modification system in accordance with the present disclosure from a user perspective. The process 400 may be performed by one or more devices disclosed herein, such as for example, system 100 illustrated in FIG. 1, discussed above. For example, the process 400 may be executed in part or wholly by the platform server 110 executing application 112 and/or the application 132 executed at the user interface system 130. In various embodiments, the process 400 may be performed partially or completely by the plurality of software modules described in connection to FIG. 3.

When a request is made relating to modifying an ability of a user interface system to control over a device, selection information may be recorded and stored in association with device, user, and/or associations information and may be stored in one or more data stores and/or at a third party system. In some embodiments, a user may be provided with access to modify a control, and a message that modifications are available. In some embodiments, the ability to modify an ability of a user interface system to control a device may be accessed by entering user identifying information and/or itinerary information. The following steps of process 400 may be performed using any user interface system(s) 130, for example, a PED and/or an in-seat device integrated into the vehicle 200 and connected to system 210. The user interface system 130 may be connected to the system 210 via a browser-based portal application or a preinstalled software application while aboard vehicle 200 and connected to on-board communication network or may be coupled to the platform server via any network connection as described above.

At block 410, a user accesses platform server 110, for example, via user interface system 130. The user (or other user) may be required to input credentials into the user interface system 130 to authenticate access via the access module 310. In some embodiments, the platform server 110 may prompt the user to enter itinerary identifying information and/or other information prior to permitting access to the functionality of the application. The access module 310 may receive the itinerary information (and/or other data) and confirm that the itinerary information (or approval for user access) exists within the data store(s) and/or an airline operator system. In some embodiments, the information may be provided via a user input into graphical user interface 136. In some embodiments, the identifying information may be extracted from an image of a boarding pass or a QR code or other barcode associated with an enclosure acquired using an image capture device coupled to the user interface system 130. In some embodiments, the user interface system 130 may transmit the scan to the application 112, which may extract the necessary information therefrom. In yet other embodiments, where an electronic boarding pass is stored on the user interface system or loaded into the application 132, the identifying information may be extracted from the stored data.

At any point between or during any of the steps described herein, a crew member may receive one or more requests relating to the requesting user and subject passenger. For example, a crew member may receive a request for a confirmation that the requesting user is in fact the person assigned to a seat number. The request may include showing an image of the person assigned to the seat number. As another example, a crew member may receive periodic requests for a confirmation the requesting user is awake. Furthermore, the crew-member may have the ability to change the modification and/or remove the modification in certain instances.

At block 415, the user may receive options for certain modifications available to the user and/or to input selection information relating to a desired modification, which can include a GUI transmitted or served by platform server 110. Platform server 110 transmits or serves the GUI in response to inputs from user interface system(s) 130, which can include information input to access platform server and/or selection information. In some embodiments, the GUI may be served in the form of a wizard, in which case two or more user interface screens may be served in a sequential manner, and one or more of the sequential user interface screens may depend on an interaction of the user or user interface system 130 with one or more preceding user interfaces. The requests to platform server 110 and the responses from platform server 110, including the screens, may both be communicated through network 120. These user interface screens or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more data stores (e.g., data stores 114) that are locally and/or remotely accessible to platform server 110. Platform server 110 may also respond to other requests from user interface system(s) 130.

At block 420, the user inputs selection information associated with a desired modification, including for example, passenger data, device data, device functionality data, authorization data, user data, timing data, restriction data, etc., and the selection information to received and analyzed by data management module 312. It should be appreciated that the user interface system used to input selections, access the server, etc. can be the passenger user interface of the subject passenger. For example, the requesting user may be a guardian of the subject passenger, and may use the passenger user interface system (e.g., IFE device the subject passenger uses to browse, select and view content) itself to initiate and cause the modification to occur. The modification can comprise password protecting the passenger user interface system such that the subject passenger cannot utilize the system without entering the password, which may only be known by the requesting user and/or crew-member.

It is also contemplated that the modification can be initiated via a crew member user interface system (e.g., crew member PED). The control disabled from the subject passenger's interface system can optionally be transferred to the crew member PED or another user interface system (e.g., another system of the crew member, or a system belonging to another passenger or user).

Data management module 312 may additionally or alternatively obtain selection information from a data store, for example, where a user made a selection previously, and the modification information associated with the selection is stored in one or more data stores, for example, in further association with user information. Alternatively, block 420 may include a request to modify an existing modification (e.g., re-enable control via the passenger user device from which control was disabled and/or transferred; extending a time period for the modification to remain in place; restricting additional content from being accessed by the subject passenger).

At block 425, the user may allow the requesting user seat number (and/or other user seat data) and subject passenger seat number (and/or other passenger seat data) to be registered together such that only user interface systems associated with the requesting user's seat can control a device or devices within the subject passenger's seat space (including passenger lighting unit, IFE display, etc.). For example, the seat numbers (and/or other seat data) can be registered in a way such that only the IFE display of requesting user's seat can be used to control a call attendant's light and/or content presented on an IFE display of the subject passenger's seat. Registering the seats together may provide a benefit of allowing the requesting user to specify and/or crew-member to identify, for whom the requesting user interface system was used (e.g., if a purchase of food via the requesting user interface system was meant for the subject passenger or the requesting user). This may be necessary in some instances, for example, if the requesting user guardian and the subject passenger child do not sit together or if the context of the request is such that it requires the cabin crew to know specifically for whom the request was made before visiting the seats.

At block 430, platform server 110 determines there is an association between requesting user and subject passenger and/or requests authorization and/or an agreement to certain terms via the requesting user's user interface system based on the selection information and/or other data. The requesting user inputs the authorization and/or agreement to terms (e.g., by checking a box, initialing, signing via touchscreen of user interface system.

At block 440, a user receives confirmation of initiation or completion of the modification via the user interface system. If the modification included a transfer such that one or more subject passenger seat devices can be controlled by a user interface system of requesting user, the user may be presented with options for controlling the subject passenger device. The options for controlling the subject passenger device may be presented in a similar or same way as the options for inputs and/or modifications are presented to the user.

At block 450, the user inputs a selection and/or selection information to control the subject passenger device (e.g., to change a channel of the IFE device of the subject passenger's seat). It is also contemplated that the requesting user may utilize the control modification system to transfer control to another user interface system (e.g., a spouse's user interface system), for example, when the requesting user needs to step away to use the restroom or wants to take a nap. The requesting user can access the platform service, input selection information requesting to transfer control to another user interface system and/or user. The platform service may then send a request to the new user via the new user interface system to accept the requested transfer. If the new user accepts the requested transfer, the new user may user then be able to control the subject passenger's device via the new user interface system. Confirmations may be sent to the new user interface system, the subject passenger interface system, and/or the requesting user interface system.

It should be appreciated that the transfers and/or additions of systems that can control a device can continue to occur between any number of users in accordance with the inventive subject matter. The control available to the transferee may be the same as, or different from (e.g., reduced, increased), the control that was available to the original requesting user via the requesting user interface system. The transferability and/or allowance of adding extra user interface systems that control a device may be convenient, for example, in case the subject passenger and requesting user (e.g., child and parent) do not sit right next to each other. This would allow the passenger next to the child to control the device, optionally with approval from the requesting user. Where the device controlled is a call attendant light, the cabin crew would need to know for whom the call is made.

FIG. 5 illustrates a block diagram of a computing system, in accordance with various aspects of the present disclosure. FIG. 5 is a high-level block diagram showing an example of the architecture of a processing system 500 (also referred to herein as a computing device) that may be implemented as any one or more of the components of the embodiments described herein. The processing system 500 can represent platform server 110, a user interface system 130, a third party system 150, content server system 218, computer system 236, or other systems and components as described herein. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 may be an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1366 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the functions and processes described above, for example, in FIGS. 1-4. For example, the software stored in memory 504 may be software architecture or software modules described in FIG. 3 for control modification. The memory 504 may be coupled to the processor 502, and the processor 502 may be configured to execute instructions (e.g., software) stored in the memory 504 to carry out the various aspects of the control modification system 100 described herein.

Also connected to the processors 502 through the bus system 505 are one or more internal mass storage devices 510, and a network adapter 512. Internal mass storage devices 510 may be, or may include, any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like).

The processing system 500 also may include one or more input/output (I/O) devices 508 coupled to the bus system 505. The I/O devices 508 may include, for example, a display device, a touch screen device, a microphone for voice commands, a camera for detecting gestures and other non-tactile inputs, a keyboard, a mouse, etc. The I/O device may be in the form of a handset having one or more of the foregoing components, such as a display with a real or virtual keyboard, buttons, and/or other touch-sensitive surfaces.

The processing system 500 also may include or otherwise be communicatively coupled to a display 514 (e.g., a display monitor or screen) coupled to bus system 505 by a display adaptor 516. The display adaptor 516 may include a graphics adapter to improve the performance of graphics intensive applications and a video controller. The processor 502 may execute instructions in memory 504 to generate a graphical user interface, such as GUI 136, for presenting one or more screens, for example, webpages or other visually presented information. The processing system 500 may also include a graphics-processing unit 518. Graphics-processing unit 518 may be a specialized electronic circuit designed to manipulate and alter memory to accelerate the creation of images in a frame buffer intended for output to a display, for example, outputting images via GUI 136. In general, graphics-processing unit 518 is efficient at manipulating computer graphics and image processing, and has a highly parallel structure that makes it more effective than general-purpose CPUs for algorithms where processing of large blocks of data is done in parallel.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

The various illustrative logical or functional blocks and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative blocks and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

What is claimed is:

1. A system for modifying control of a device, the system comprising:
   a content distribution system configured to provide a vehicle communication network for the vehicle;
   at least one data store coupled to the vehicle communication network, the at least one data store configured to store passenger data, device data, and user interface system data; and
   at least one processor coupled to the vehicle communication network and to at least one memory programmed with executable instructions, the at least one processor configured to execute the executable instructions to:
      receive, from a first user interface system carried by the vehicle and coupled to the vehicle communication network, selection information associated with a passenger and a device;
      determine, based at least in part on a query of the at least one data store, that a valid association exists between the first user interface system and the passenger; and
      modify an ability of the passenger to control the device, wherein the device comprises a seatback monitor, and
         wherein the modify the ability of the passenger to control the seatback monitor comprises at least one of:
            (a) transfer full control of the seatback monitor from a passenger interface system to the first user interface system,
            (b) select a set of content from a content library, and at least one of cause it to be played on the seatback monitor, or make the set of content the only items to be selectable by the passenger interface system communicatively coupled with the seatback monitor, or
            (c) send a request to the first user interface system upon reception of a control selection via a passenger user interface system controlled by the passenger, and cause the seatback monitor to display content according to the control selection only upon reception of an authorization input via the first user interface system.

2. The system of claim 1, wherein the vehicle is an aircraft, and wherein the content distribution system, the at least one data store, the at least one processor, and the at least one memory are within the aircraft.

3. The system of claim 1, wherein the first user interface system comprises at least one of a passenger personal electronic device (PED), a passenger control unit (PCU), a crew-member PED, or an in-seat device.

4. The system of claim 1, wherein the at least one data store is further configured to store a set of associations between passengers on a flight.

5. The system of claim 4, wherein the set of associations include associations between passengers.

6. The system of claim 1, wherein the first user interface system is a crew-member controlled device.

7. The system of claim 1, wherein the modify the ability of the passenger to control the device comprises limit the passenger's access to content viewable on the seatback monitor.

8. The system of claim 1, wherein the at least one processor is further configured to execute the executable instructions to display a confirmation on at least one of a display of the first user interface system or a display of a second user interface system carried by the passenger.

9. The system of claim 1, wherein the passenger data comprises at least one of an age, a seat number, allowable content, a functionality, a status as a guardian, a restriction, an authorization, a disability, or a time.

10. The system of claim 1, wherein the user interface system data comprises data relating to user interface systems that are configured to control a set of devices.

11. A method of modifying control over a device in a vehicle, comprising:
  receiving, from a first user interface system carried by the vehicle and coupled to a vehicle communication network, selection information associated with a passenger and a device;
  determining, based at least in part on a query of the at least one data store, that a valid association exists between the passenger and a user of the first user interface system; and
  modifying an ability of the passenger to control the device via a passenger user interface system carried by the vehicle and associated with the passenger based on the determining that the valid association exists between the passenger and the user of the first user interface system,
  wherein the device comprises a seatback monitor, and
  wherein the modifying the ability of the passenger to control the seatback monitor comprises at least one of:
    (a) transferring full control of the seatback monitor from a passenger interface system to the first user interface system,
    (b) selecting a set of content from a content library, and at least one of causing it to be played on the seatback monitor, or making the set of content the only items to be selectable by the passenger interface system communicatively coupled with the seatback monitor, or
    (c) sending a request to the first user interface system upon receiving a control selection via the passenger user interface system controlled by the passenger, and causing the seatback monitor to display content according to the control selection only upon receiving an authorization input via the first user interface system.

12. The method of claim 11, wherein the steps of receiving, determining and modifying occur via at least one processor coupled to the vehicle communication network and to at least one memory programmed with executable instructions.

13. The method of claim 11, wherein the at least one processor is within the vehicle, and wherein the vehicle is an aircraft.

14. The method of claim 11, wherein the first user interface system comprises at least one of a passenger personal electronic device (PED), a passenger control unit (PCU), a crew-member PED, or an in-seat device.

15. The method of claim 11, wherein the passenger is a minor, wherein the second user interface system is associated with the passenger's seat, and wherein the valid association indicates the user is a guardian of the passenger.

16. The method of claim 11, wherein the device comprises a call button.

17. The method of claim 11, wherein modifying an ability of the passenger to control the device comprises limiting the passenger's access to content viewable on the seatback monitor.

18. The method of claim 11, wherein modifying the ability of the passenger to control the device comprises at least one of disabling a signal from passing from the passenger user interface system to the device.

19. The method of claim 18, wherein modifying the ability of the passenger to control the device further comprises enabling a signal to pass from the first user interface system to the device.

20. The method of claim 11, further comprising:
  storing a set of associations between passengers on a flight.

* * * * *